United States Patent [19]

Reis et al.

[11] 4,061,556

[45] Dec. 6, 1977

[54] PORTABLE ELECTROLYTIC APPARATUS FOR PURIFYING DRINKING WATER

[75] Inventors: August Reis, Munich; Fritz Fend, Regensburg; Karl Hils, Hambach, all of Germany

[73] Assignee: Sachs-Systemtechnik GmbH, Schweinfurt am Main, Germany

[21] Appl. No.: 776,238

[22] Filed: Mar. 10, 1977

[30] Foreign Application Priority Data

Mar. 10, 1976 Germany ............................ 2609846

[51] Int. Cl.$^2$ .............................................. C02B 1/82
[52] U.S. Cl. .................................. 204/271; 204/149; 204/269; 204/275
[58] Field of Search ............... 204/149, 229, 269, 271, 204/275

[56] References Cited

U.S. PATENT DOCUMENTS

| 3,385,779 | 5/1968 | Nishiba et al. | 204/275 X |
| 3,546,088 | 12/1970 | Barkman et al. | 204/271 X |
| 3,616,453 | 10/1971 | Philpot | 204/301 X |
| 3,891,515 | 6/1975 | Paulson et al. | 204/275 X |
| 3,898,150 | 8/1975 | Russell et al. | 204/149 X |
| 3,926,768 | 12/1975 | Burgess | 204/229 |

*Primary Examiner*—Arthur C. Prescott
*Attorney, Agent, or Firm*—Hans Berman

[57] ABSTRACT

The housing of an electrolytic purification apparatus defines a receiving chamber and an electrolytic cell. The receiving chamber communicates with a filling aperture at the top of the housing which is upwardly open in the operating position of the apparatus. A first conduit connects a bottom portion of the chamber with an inlet portion of the cell, and a second conduit connects an outlet portion of the cell, upwardly spaced from the inlet portion but lower than the filling aperture, with a discharge aperture at the lower end of the housing. The chamber, cell, and conduits define a continuous path of liquid flow from the filling to the discharge aperture, the path extending downward in the chamber, upward in the cell, and downward again in the second conduit. Two electrodes, offset from the flow path in the cell in opposite, transverse directions, are supplied with direct current for passage of the current in the cell through liquid flowing in the aforedescribed flow path.

11 Claims, 6 Drawing Figures

PORTABLE ELECTROLYTIC APPARATUS FOR PURIFYING DRINKING WATER

This invention relates to the electrolytic purification of drinking water, and particularly to portable electrolytic apparatus for purifying drinking water.

Portable water purification apparatus usually is used intermittently whenever the need for drinking water arises. It is inconvenient to decontaminate the apparatus prior to each use. Yet, known electrolytic apparatus of this type contains enough raw water at the time its operation is terminated to require a substantial amount of water to be discarded when operation is resumed until all contaminants are flushed out. Where the water supply for the apparatus also needs to be carried along, the loss of water during the start-up of the apparatus may not be permissible. Even where a local source of impure water is available, the waste of electric current during start-up is usually not acceptable.

An important object of this invention is the provision of electrolytic apparatus for water purification which delivers purified water substantially from the first drop discharged after an extended interruption of service.

With this object and others in view, as will hereinafter become apparent, the invention provides apparatus of the type described whose housing has first and second terminal parts, and which includes suitable elements for setting up the housing in an operating position in which the first part is upwardly offset from the second part. The housing defines therein a receiving chamber and an electrolytic cell, and the chamber communicates with an upwardly open filling aperture in the first housing part. A first conduit connects a bottom portion of the chamber, downwardly spaced from the filling aperture, with an inlet portion of the electric cell. A second conduit connects an outlet portion of the cell, upwardly spaced from the inlet portion but lower than the filling aperture of the housing in the operating position of the latter, with a discharge aperture in the second housing portion. The chamber, cell, and conduits define a continuous path of liquid flow between the housing apertures, the path extending downwardly in the chamber and in the second conduit, and upwardly in the cell. Two electrodes in the cell are offset from the path of liquid flow in opposite, transverse directions and may be supplied with direct current for passage of the current in the cell through liquid flowing in the path.

Other features, additional objects, and many of the attendant advantages of this invention will readily be appreciated as the same becomes better understood by reference to the following detailed description of preferred embodiments when considered in connection with the appended drawing in which.

Figure 1:
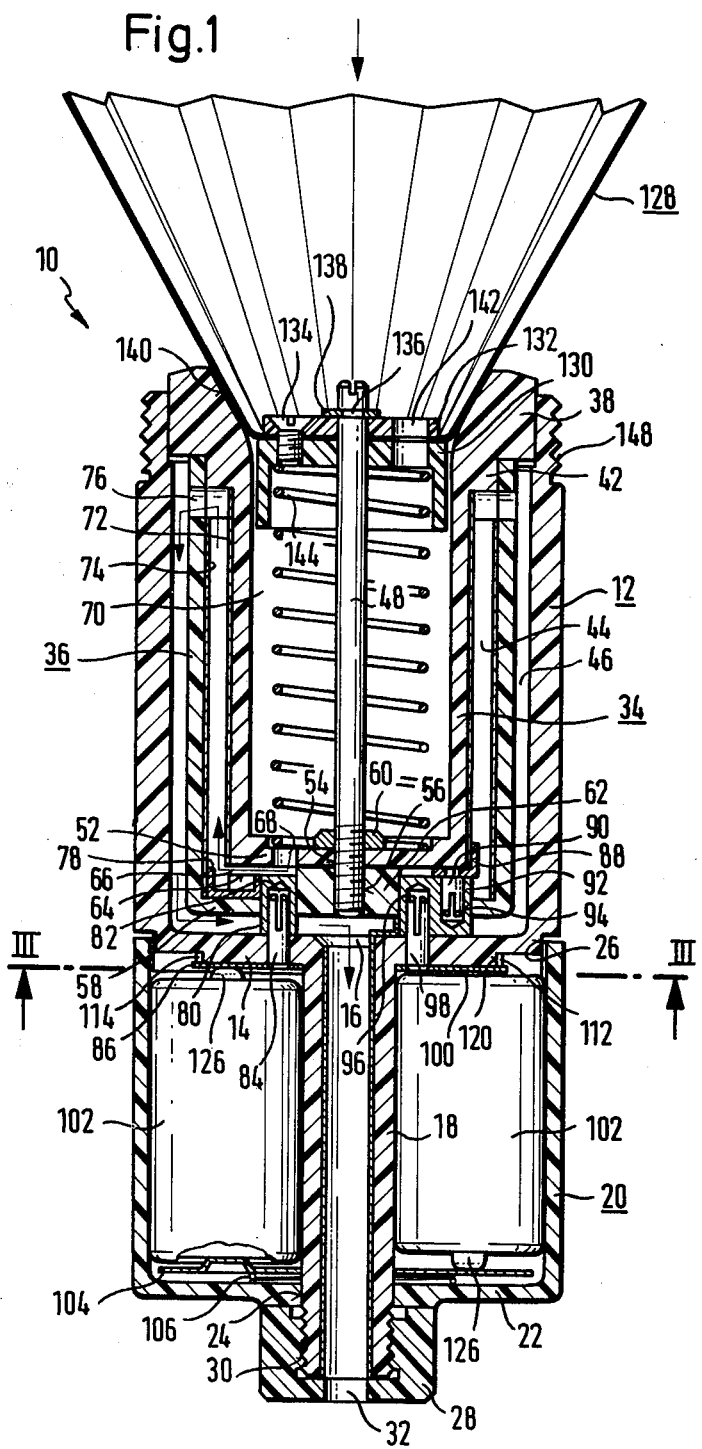
FIG. 1 shows portable electrolytic apparatus of the invention in its operating position and in elevational section.
Figure 4:
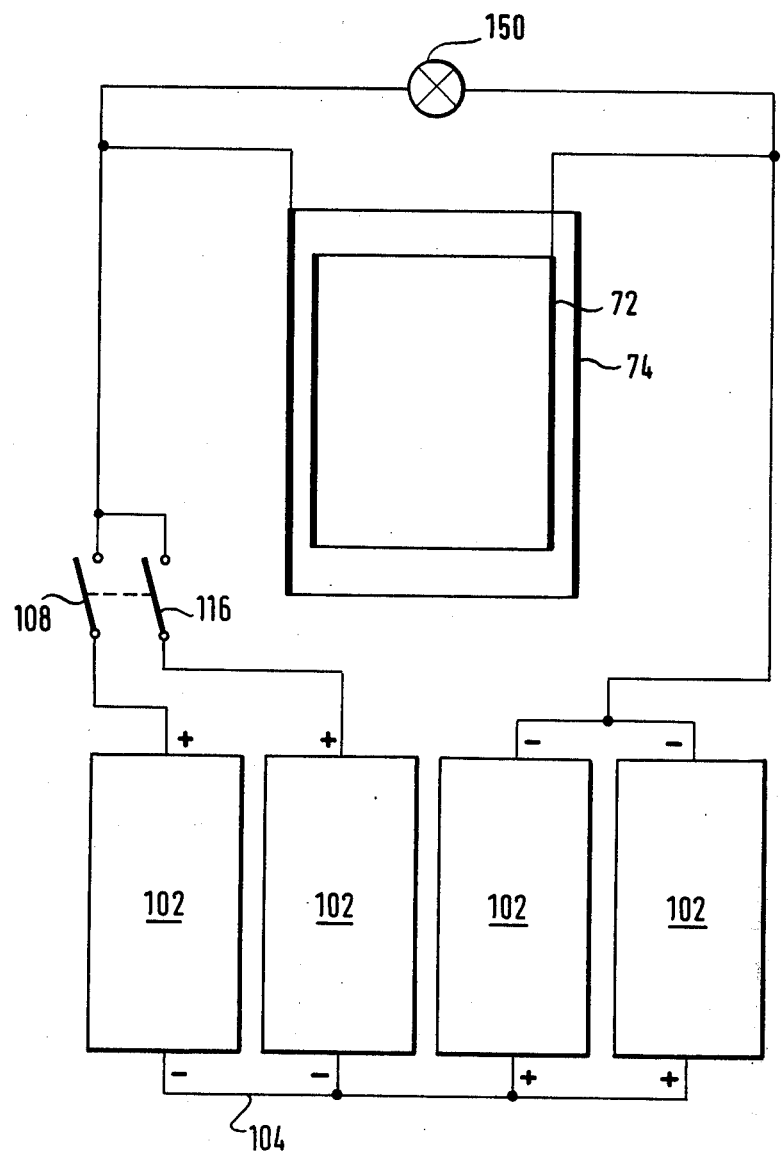
Figure 5:
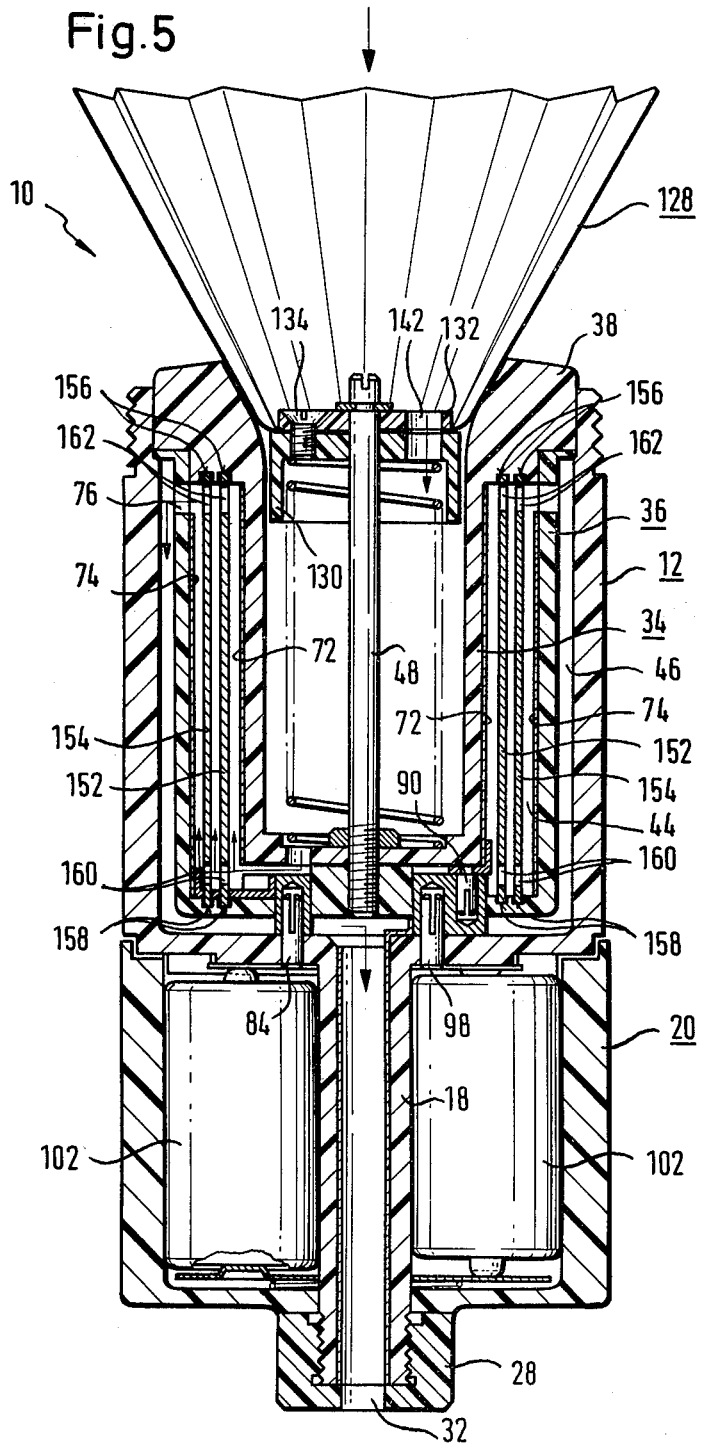
Figure 6:
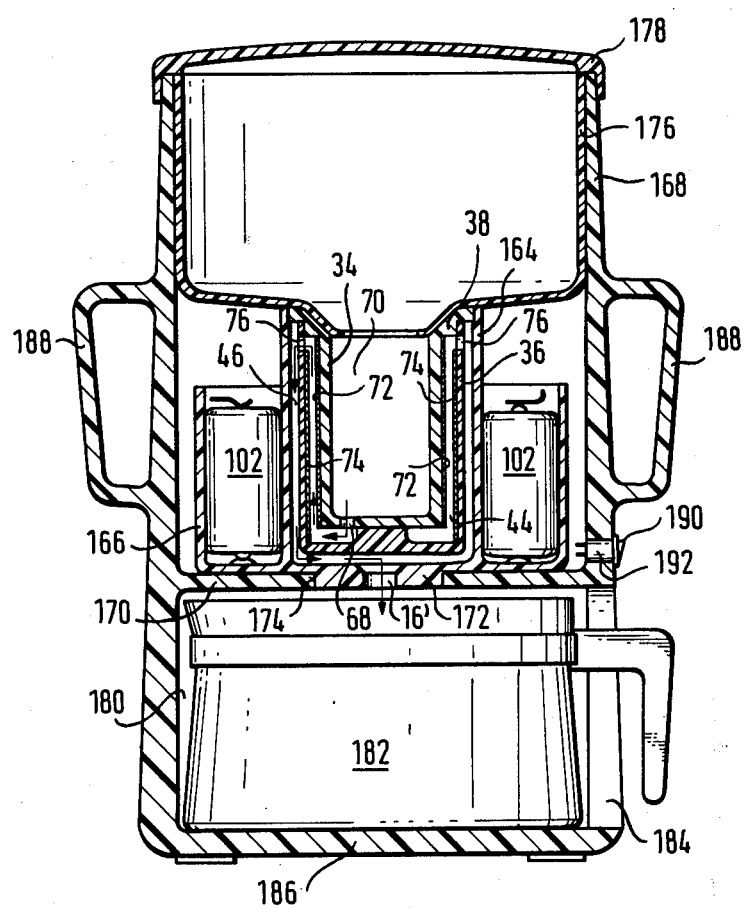

FIG. 4 diagrammatically illustrates the electric circuit in the apparatus of FIG. 1; and FIGS. 5 and 6 show modified apparatus of the invention in respective views corresponding to that of FIG. 1.

Referring now to the drawing in detail, and initially to FIG. 1, there is seen a cylindrical, plastic housing 10 having an upper axial section 12 which encloses a cell assembly and a lower section 20 which is a battery casing. The housing section 12 has a radial bottom wall 14 formed with a central opening 16 from which a coaxial discharge tube 18 depends. The battery casing 20 also has a radial bottom wall 22. The tube 18 passes outward through a central opening 24 in the wall 22. A shoulder 26 on the housing section 12 is conformingly received in the upwardly open rim of the battery casing 20 so that the bottom wall 14 upwardly closes the battery casing. A cap nut 28 engages external threads 30 on the end portion of the tube 18 which projects from the opening 24 and thereby secures the battery casing 20 to the housing section 12. Access to the battery casing is readily available by unscrewing the nut 28 which is externally knurled (see FIG. 2). A discharge aperture 32 in the nut 28 is aligned with the bore of the tube 18.

The interior space of the housing section 12 is divided by two approximately cup-shaped partitions. The walls 34, 36 of the partitions are cylinders coaxial with the housing 10 and radially spaced from each other and the inner housing wall. A flange 38 projects radially outward from the radially inner wall 34 and conformingly engages the top rim of the housing section 12. A shoulder 42 of the flange 38 similarly engages the other partition wall 36 so that an annular cell 44 between the walls 34, 36 and an annular discharge conduit 46 between the wall 36 and the housing section 12 are bounded in an axially upward direction by the flange 38.

The threaded bottom end of a coaxial spindle 48 passes through a smooth, central bore 54 of a radial partition wall 52 integrally fastened to the axial wall 34. The spindle is threadedly received in a central bore 56 of a radial partition wall 58 integrally fastened to the axial wall 36. A nut 60 on the spindle 48 clamps the wall 52 to the wall 58. The circular bottom face of the radial wall 52 is flat. The top face of the wall 58 is stepped. The central portion 62 of the wall 58 is held in contact with the wall 52 by the spindle 48. The slightly lower, annular, intermediate portion 64 of the wall 58 bounds an axially narrow throttling gap 66 with the bottom face of the wall 52. The gap is open in a radially outward direction and communicates with eccentric axial bores 68 in the radial partition wall 52, only one of the several bores 68 being seen in FIG. 1. The bores 68 connect a receiving chamber 70 bounded by the walls 34, 52 to the gap 66.

The faces of the partition walls 34, 36 in the electrolytic cell 44 carry cylindrical electrodes 72, 74 which are metal sheets adhesively fastened to the walls or electrodeposited directly on the wall faces. The diameter of the silver anode 72 on the wall 36 is greater than that of the cathode 74 on the wall 34. The cathode 74 consists of metal inert to the water to be purified. Type 316 stainless steel may be chosen for an adhesively secured cathode, and nickel makes a cathode material suitable to be electrodeposited on the wall 36.

Radial bores 76 in the partition wall 36 contiguously adjacent the flange 38 connect the electrolytic cell 44 with the discharge conduit 46. An integral, radial lug 78 connects the anode 74 to a tubular, metallic receptacle 80 molded into axial passage of the plastic wall 58. In the assembled, illustrated condition of the apparatus, a partly slotted pin 84 is received in the bore 82 of the receptacle 80. The pin 84 is molded into the plastic bottom wall 14 of the housing section 12. It extends into the battery casing 20 where it is conductively connected to a contact element 86 also making contact with flashlight batteries 102.

Another radial lug 88 on the cathode 72 carries a partly slotted contact pin 90 releasably received in an axial, upwardly open bore 94 in a metallic insert 92 molded into the wall 58. Another bore 96 of the insert 92 is open downwardly and receives another contact pin 98 molded into the bottom wall 14. Its end in the battery casing 20 is conductively connected to a contact element 100 for current flow from the flashlight batteries 102. A flat, annular metal plate 104 in the casing 20 is urged upward against the batteries 102 by a compression spring 106 interposed between the bottom wall 22 and the plate 104.

Figure 3:
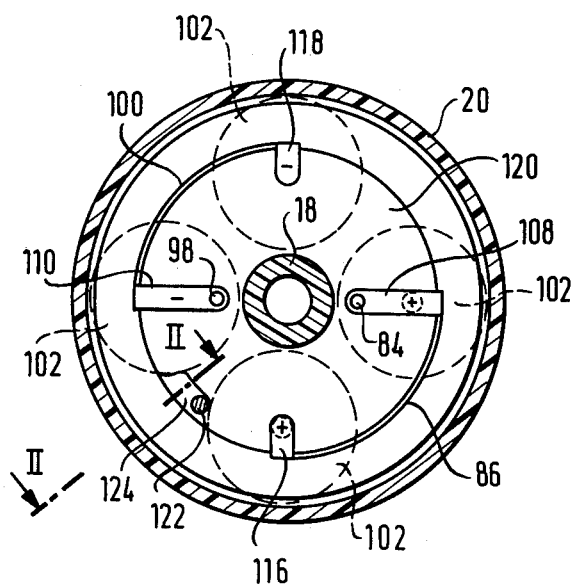
FIG. 3 is a sectional view of the apparatus taken on the line III — III in FIG. 1.

As is better seen in FIG. 3, the contact elements 86, 100 are flat strips of spring temper metal whose main portions are cylindrically arcuate about the axis of the housing 10. Longer end portions 108, 110 of the elements are bent into a radial plane and extend radially inward, as are shorter end portions 116, 118. The end portions 108, 110 are fastened to the pins 84, 98. The downwardly directed face of the bottom wall 14 has a projecting central part 120. The arcuate portions of the elements 86, 100 are fastened by adhesive to the narrow cylindrical face of the wall part 120. The end portions 108, 116 of the contact element 86 are engaged by the positive terminals 126 of two batteries 102, the end portions 110, 118 are engaged by the negative bottom walls of two other batteries 102, the four batteries being shown in phantom view in FIG. 3. The other four battery terminals are conductively connected by the plate 104.

While the nut 28 prevents a significant axial movement of the battery casing 20 on the housing section 12, it permits angular movement about the housing axis. As is evident from joint consideration of FIGS. 2 and 3, angular movement is limited by a pin 122 molded into the plastic wall of the battery casing 20 and projecting into a circumferentially short slot 124 in the wall part 120. When the casing 20 is turned clockwise from the position shown in FIG. 3 as far as the pin 122 permits, the current supply to the anode 74 is interrupted by the end portions 108, 116 of the contact element 86 moving away from the terminals 126. A pilot lamp 150 is received in an outwardly, open, radial bore of the battery casing 20.

Figure 2:
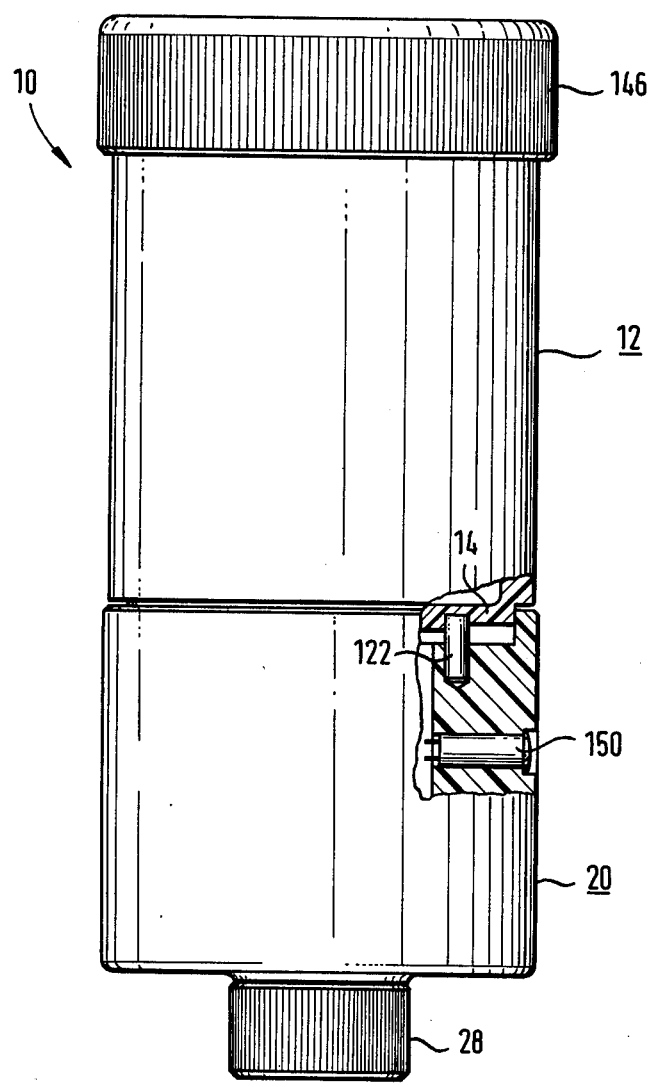
FIG. 2 illustrates the apparatus of FIG. 1 in the closed condition in elevation and partly in section on the line II — II in FIG. 3.

The electrical circuit of the apparatus of FIGS. 1 – 3 is conventionally illustrated in FIG. 4. Pairs of batteries 102 are connected in parallel, and the two pairs are connected in series circuit between the electrodes 72, 74. The spring portions 108, 116 constitute movable elements of a switch between the anode 74 and the four batteries 102. The pilot lamp 150 is arranged in parallel circuit with the electrodes.

Reverting to FIG. 1, there is seen a collapsible funnel 128 of thin, pleated stainless steel sheet. Its lower end is clamped between a plastic disc 130 having a depending skirt and a flat plastic ring 132 by screws 134. An annular groove 136 in the top end of the spindle 48 receives a spring clip 138 which limits upward movement of the ring 132 under the biasing force of a helical compression spring 144 interposed in the chamber 70 between the disc 130 and the radial partition wall 52. The part of the funnel 128 near the disc 130 is backed by the downwardly tapering, conical face 140 of the flange 38 which bounds the filling aperture of the housing 10. Aligned axial bores 142 in the disc 130 and the ring 132 prevent the disc and ring from blocking the filling aperture. When the apparatus is idle, the funnel 128 may be pushed completely into the chamber 70 against the restraint of the spring 144, and the filling aperture may be closed by an externally knurled cover 146 (FIG. 2) engaging male threads 148 on the housing section 12.

The apparatus is operated as follows:

The bottom wall 22 is set on the rim of a receptacle or of a bottle. The cover 146 is unscrewed and removed, whereby the spring 144 pushes the funnel 128 into the operative position of FIG. 1. The battery casing 20 is turned until the pilot lamp 150 lights. The apparatus then is ready to receive water which flows from the funnel 128 into the receiving chamber 70. As the water level rises in the chamber 70, a corresponding level is established in the electrolytic cell 44 which communicates with the chamber 70 through the bores 68 and the gap 66. Current begins flowing between the electrodes 72, 74, and microorganisms in the water are destroyed partly by anodic oxidation and partly by minute amounts of silver dissolving from the anode 72, as is known in itself. The disinfected water rises in the cell 44 until its level in the chamber 70 is high enough to cause overflow from the cell 44 into the discharge conduit 46. Purified water starts flowing from the discharge aperture 32 into the non-illustrated vessel or bottle. A sufficient rate of water supply to the funnel 128 causes the discharge conduit 46 to be filled completely with liquid during operation of the apparatus. The flow rate is controlled by the effective flow section of the gap 66 which is smaller than the flow section of any other part of the flow path through the apparatus.

When no further water is supplied to the funnel 128, the cell 44 and conduit 46 jointly act as a syphon which empties the chamber 70 of raw water. Only when all water has left the chamber 70, air is drawn into the gap 66 by the column of purified water flowing from the aperture 32 into the non-illustrated receptacle or bottle and renders the syphon inoperative. All purified water is drained from the discharge conduit 46, and only a small amount of at least partly sterilized water remains in the lowermost inlet portion of the cell 44 and the bottom portion of the chamber 70. It is again subjected to a practically full measure of electrolytic purification when operation is resumed. No raw water can remain in the upper discharge portion of the cell 44 nor in any part of the apparatus downstream from the cell 44. The throttling effect of the gap 66 is important because it limits the amount of residual water in the apparatus after each run.

An actual embodiment of the invention substantially as shown in FIGS. 1 to 4 had an overall axial length of about 180 mm. The receiving chamber had a diameter of 34 mm. The external diameter of the partition wall 34 was 41 mm, the internal diameter of the partition wall 36 about 48 mm, and the gap between the electrodes 72, 74 was slightly less than 5 mm. The walls bounding the discharge conduit 46 had diameters of 55 and 64 mm respectively. The gap 66 controlled the flow rate to approximately 6 ml per second when the chamber 70 was full. The batteries 102 were standard flashlight batteries of D-size and supplied 1.5 volts each when fresh. They could be used until their combined voltage dropped to 1.8 volts. At the indicated flow rate, neither E. coli nor other coliform microorganisms could be cultured from a 100 ml specimen of the purified water although they were abundant in the raw water supplied to the funnel 128. The contaminated water was practically clear. If it had been turbid, a paper filter could have been set into the funnel 128 in an obvious manner. When operation of the apparatus was discontinued for 2 days, the first few drops discharged from the aperture 32 during a second run were equally free from potentially pathogenic microorganisms.

Among the modifications of the afore-described apparatus which have been found useful under specific conditions, two are illustrated in FIGS. 5 and 6. The purification apparatus seen in FIG. 5 is closely similar to that described with reference to FIGS. 1 to 4 except for minor dimensional changes, and common structural elements have been designated by the same reference numerals as in the first embodiment. They do not require repeated description.

The only significant feature distinguishing the modified apparatus are two cylindrical, bi-polar electrodes 152, 154 of stainless steel coaxially and spacedly interposed between the electrodes 72, 74. Their circular edges are secured in grooves 156 of the flange 38 and of the radial wall 58. Radial openings 160 in the electrodes 152, 154 near the wall 58 and similar openings 162 near the flange 38 maintain the desired flow in all three compartments of the electrolytic cell separated by the bi-polar electrodes. The necessary higher voltage for decomposing water in the radially wider electrolytic cell of the modified apparatus is provided by dry cell batteries of suitably higher output voltage than that of standard D-size batteries or by a different circuit connection of otherwise unchanged batteries, obvious in itself.

Where portable water purifying apparatus may be set up on a table, bench, or other horizontal supporting surface, the modified embodiment of the invention illustrated in FIG. 6 may be employed to advantage. Its cell assembly 164 is closely similar to the corresponding elements of the device shown in FIGS. 1 – 4 and has been shown only partly on the smaller scale of FIG. 6. It is centered in an annular battery casing 166 which also provides the outer axial wall of the cell assembly 164. The integrally connected cell assembly 164 and battery casing 166 are coaxially set into the upright, cylindrical cavity of an outer plastic shell 168 whose wall thickness increases downward to an integral bottom wall 186 by means of which the apparatus may be set up on any horizontal supporting surface.

An apertured integral partition 170 separates a lower compartment 180 of the shell cavity from the upper compartment in which the cell assembly 164 and the battery casing 166 rest on the partition 170. An axially short, cylindrical portion 172 of the bottom wall of the cell assembly 164 is conformingly received in a central opening 174 of the partition 170 and is itself formed with a discharge aperture 16'.

A funnel 176 is loosely received in the upper shell compartment above the cell assembly 164 and is protected by a cover 178 when the apparatus is idle. During operation of the apparatus, water is poured into the collecting chamber 70 of the cell assembly 164 through the funnel 176, and purified water drops from the aperture 16' into a collecting vessel 182 which may be introduced into the compartment 180 through a radial access opening 184 and withdrawn through the opening at the end of a run. Two integral handles 188 on the outer face of the shell permit convenient transportation of the apparatus of FIG. 6 which is larger and heavier than the device specifically described with reference to FIGS. 1 to 4.

The energizing circuit for the cell is closed by a switch 190 inserted in the shell. Instead of switch 190 a limit switch may close the energizing circuit for the cell assembly 164 upon insertion of the vessel 182 into the compartment 180. A pilot lamp 192 is inserted in the outer shell 168.

Molded plastics are the preferred materials of construction for almost all elements of the afore-described purifying apparatus other than the conducting elements of the electrolytic circuit, but metals suitably insulated from the electrical circuitry may be employed as exemplified by the funnel 128. Safety from electrical shock is not a controlling consideration in the illustrated, battery-operated devices. If an external source of current is available, as from the battery or generator of an automobile, the battery casing may hold a variable resistor instead of batteries, and a power cable carrying a plug may extend from the battery casing in an obvious manner. If alternating line current can be expected to be available, the battery casing may hold a step-down transformer and rectifying diodes. Other adaptations of the illustrated embodiment to specific operating conditions will readily suggest themselves.

The dimensions of the apparatus of the invention may be chosen to meet desired capacity requirements, but the spacing of the electrodes transverse to the path of water flowing therebetween is preferably between 1 mm and 5 mm. The use of bi-polar electrodes in the manner shown in FIG. 5 is advisable where the necessary flow section of the electrolytic cell makes it necessary to provide a wider spacing between the electrodes directly connected to the battery terminals.

It is a commmon feature of the illustrated embodiments of the invention that they can be disassembled without tools whenever it is desired to clean them. The apparatus shown in FIG. 1 may be taken apart after removal of the nut 28 from the tube 18 and release of the spindle 48 from the radial wall 58. A slot in the top end of the spindle permits the insertion of a screw driver or small coin for this purpose. Only the contact pins 84, 90, 98 thereafter hold the cup-shaped partitions 34, 52 and 36, 58 in place and permit axial withdrawal of the partitions by minimal applied force, whereby all electrical connections to the cell assembly are also interrupted. The modified apparatus of FIG. 5 is disassembled in the same manner. The cell assembly 164 with the battery casing 166 is held in the shell 168 by gravity only and may itself be disassembled in a manner obvious from the afore-described disassembly of the device of FIG. 1.

It should be understood, of course, that the foregoing disclosure relates only to preferred embodiments of the invention, and that it is intended to cover all changes and variations in the examples of the invention herein chosen for the purpose of the disclosure which do not constitute departures from the spirit and scope of the invention set forth in the appended claims.

What is claimed is:

1. Apparatus for purifying drinking water comprising:
    a. a housing having first and second terminal parts;
    b. means for setting up said housing in an operating position in which said first part is upwardly offset from said second part,
        1. said housing defining therein a receiving chamber and an electrolytic cell,
        2. said chamber communicating with an upwardly open filling aperture in said first part;
    c. first conduit means connecting a bottom portion of said chamber downwardly spaced from said filling aperture with an inlet portion of said cell;

d. second conduit means connecting an outlet portion of said cell upwardly spaced from said inlet portion, but lower than said filling aperture in said operating position, with a discharge aperture in said second part,
   1. said chamber, said cell, and said first and second conduit means defining a continuous path of liquid flow from said filling aperture to said discharge aperture,
   2. said path extending downwardly in said chamber, upwardly in said cell, and downwardly in said second conduit means;
e. two electrodes in said cell offset from said path in opposite, transverse directions; and
f. supply means for supplying direct current to said electrodes for passage of the current in said cell through liquid flowing in said path.

2. Apparatus as set forth in claim 1, wherein said first conduit means has an effective flow section substantially smaller than the flow sections of said chamber, of said cell, and of said second conduit means.

3. Apparatus as set forth in claim 1, wherein said housing defines a battery compartment therein, said supply means including two contact elements exposed in said compartment and conductively connected to said electrodes respectively.

4. Apparatus as set forth in claim 3, wherein said housing has an axis extending in a direction from said first part to said second part and includes a plurality of axial wall members annular about said axis and spaced from each other transversely of said axis, a first one of wall members nearest said axis bounding said chamber, said first wall member and a second wall member bounding said cell therebetween, said cell being annular about said chamber, said electrodes including metal sheets secured to said first and second wall members respectively in area contact.

5. Apparatus as set forth in claim 4, wherein said second conduit means are annular about said cell and bounded by said second wall member and a third one of said wall members.

6. Apparatus as set forth in claim 5, wherein said wall members are cylindrical about said axis.

7. Apparatus as set forth in claim 6, wherein said housing further includes first, second, and third bottom walls transverse to said axis and respectively fixedly fastened to said first, second, and third wall members, and threaded fastening means releasably fastening two of said bottom walls to each other.

8. Apparatus as set forth in claim 7, wherein said housing further includes a flange radially outwardly projecting from said first wall member and upwardly bounding said cell and said second conduit means.

9. Apparatus as set forth in claim 6, further comprising a funnel, and guide means on said housing for guiding said funnel between a first position and a second position, said funnel in said first position extending outward of said filling aperture from said housing, said funnel in said second position being substantially completely received in said chamber.

10. Apparatus as set forth in claim 1, further comprising yieldably resilient means biasing said funnel from said second position toward said first position.

11. Apparatus as set forth in claim 1, further comprising at least one handle on said housing.

* * * * *